UNITED STATES PATENT OFFICE.

DAVID BAIRD MACDONALD, OF LEICESTER, AND JACKSON CALVERT, OF HUDDERSFIELD, ENGLAND; SAID CALVERT ASSIGNOR TO SAID MACDONALD.

MANUFACTURE OF NITROPHENOLS.

1,320,077.     Specification of Letters Patent.     Patented Oct. 28, 1919.

No Drawing.     Application filed November 21, 1917. Serial No. 203,183.

*To all whom it may concern:*

Be it known that we, DAVID BAIRD MACDONALD and JACKSON CALVERT, subjects of the King of Great Britain, residing at Leicester, England, and Huddersfield, England, respectively, have invented certain new and useful Improvements in or Relating to the Manufacture of Nitrophenols, of which the following is a specification.

This invention relates to the manufacture of nitro-phenols and consists in an improvement in the process wherein nitric acid (concentrated or diluted) benzene and mercuric nitrate are used.

The action of nitric acid on benzene in the presence of mercuric nitrate produces picric acid (tri-nitro-phenol), and nitro-benzene along with more or less mono-nitro-phenol.

The object of the invention is to facilitate the formation of nitro-phenols, particularly 2:4-di-nitro-phenol, and this is achieved by bringing into intimate contact with the mass during the carrying out of the aforesaid process, oxygen or air or a mixture of same, or a mixture of oxygen or air (or both) with carbon dioxid. The use of carbon dioxid alone, for the purpose just mentioned, forms the subject of our co-pending United States application Serial No. 203182.

The intimate contact may be brought about in any suitable manner such for example as by forcing or sucking the oxygen, air or aforesaid mixture through or into the mass.

Or the nitric acid and mercuric nitrate may be mixed apart from the benzene, and the oxygen, air or aforesaid mixture may be passed through the benzene and the vapor or spray of benzene thus produced and containing the benzene and oxygen, air or mixture passed into or through the mixture of nitric acid and mercuric nitrate.

Or the benzene and mercuric nitrate in solution in a sufficiency of nitric acid may be mixed apart from the bulk of the nitric acid, and the oxygen, air or aforesaid mixture may be passed through the nitric acid and the mixed vapor or spray passed into or through the mixture of benzene, mercuric nitrate and nitric acid.

The oxygen, air or mixture may be used at a suitable pressure and temperature for the purpose previously stated.

To enable the invention to be clearly understood, three examples of the manner in which it may be carried into practical effect will now be described.

According to one example, the process consists in dissolving 4 grams of mercury in 90 grams of nitric acid (sp. gr. 1.42) diluted with 7 grams of water; to this 40 grams of benzene are added. Into this mass a slow stream of oxygen or air or a mixture of same, or a mixture of oxygen or air (or both) with carbon dioxid (the quantities and proportions of which are hereinafter set forth), is passed, the temperature being maintained at approximately 40° to 50° C. with or without extra agitation. After a period of about 6 hours, or when the action ceases, the top layer, consisting of a solution of 2:4-di-nitro-phenol, some nitro-benzene and traces of ortho-mono-nitro-phenol in benzene, is drawn off and from this the 2:4-di-nitro-phenol may be separated by evaporating off the volatile products leaving the 2:4-di-nitro-phenol in a commercially pure condition. 2:4-di-nitro-phenol remaining in the acid liquor may be extracted with benzene which is then evaporated off.

Alternatively when the action ceases, a jet of steam may be introduced into the mixture to separate, by distillation, the benzene, nitro-benzene and any ortho-mono-nitro-phenol present, after which the 2:4-di-nitro-phenol may either be drained off, after cooling, or may be extracted with benzene and separated as aforesaid.

In another example, 4 grams of mercury may be dissolved in 20 grams of nitric acid (sp. gr. 1.39), to which is added 40 grams of benzene. A stream of oxygen or air or a mixture of same, or a mixture of oxygen or air (or both) with carbon dioxid (the quantities and proportions of which are hereinafter set forth) is passed through a flask or vessel containing 70 grams of nitric acid (sp. gr. 1.42) the mixed vapors from the flask or vessel being led into the mixture of mercuric nitrate, nitric acid and benzene, the temperature being maintained at approximately 40° to 50° C. When the action ceases, separation may be effected in a similar manner to that described in the previous example. The mixed vapors from the flask or vessel may be either drawn or forced through or into the mixture of mercuric nitrate, nitric acid and benzene.

The quantities and proportions of the gases and gas mixtures to be employed in the two examples just described are as follows:—

Oxygen (used alone) 8 grams.
Air (used alone) 35 grams.
When mixed, oxygen 4 grams and air 18 grams.
When mixed, oxygen 4 grams and carbon dioxid 11 grams.
When mixed, air 17 grams and carbon dioxid 11 grams.
When mixed, oxygen 3 grams, air 12 grams and carbon dioxid 7 grams.

These quantities are passed into the mass or through the flask or vessel as the case may be in the period of about 6 hours mentioned, and at a pressure of approximately 1 atmosphere above normal.

According to a further example, the oxygen or air or mixture of same, or a mixture of oxygen or air (or both) with carbon dioxid, may be first passed through benzene contained in a separate vessel, the mixed vapors being let into a mixture of nitric acid and mercuric nitrate, the temperature being maintained at approximately 40° to 50° C. The ingredients may be used in proportion approximately similar to those given in the two examples previously described. The vapors may be either drawn or forced through or into the mixture, the products being separated as previously set forth.

In carrying out the herein described example provision may be made in a suitable manner for condensing and collecting the benzene, nitrogen oxids and nitric acid vapors (which are evolved in carrying out the process) for further use.

The invention is not to be confined to the proportions of the ingredients specified in the herein described examples as such proportions may be varied without departing from the spirit of the invention as defined by the appended claims.

What we claim then is:—

1. In the manufacture of nitro-phenols by the process wherein nitric acid, benzene and mercuric nitrate are used, introducing air by drawing or forcing in through or into the mixture of mercuric nitrate, nitric acid and benzene.

2. In the manufacture of nitro-phenols by the process wherein nitric acid, benzene and mercuric nitrate are used, introducing a mixture of air and carbon dioxid by drawing or forcing it through or into the mixture of mercuric nitrate, nitric acid and benzene.

3. In the manufacture of nitro-phenols by the process wherein nitric acid, benzene and mercuric nitrate are used, introducing air into the mixed mercuric nitrate, nitric acid and benzene, by first passing it through nitric acid and then drawing or forcing the mixed vapors into or through the mixed mercuric nitrate, nitric acid and benzene.

4. In the manufacture of nitro-phenols by the process wherein nitric acid, benzene and mercuric nitrate are used, introducing a mixture of air and carbon dioxid, into the mixed mercuric nitrate, nitric acid and benzene, by first passing it through nitric acid and then drawing or forcing the mixed vapors into or through the mixed mercuric nitrate, nitric acid and benzene.

In testimony whereof we affix our signatures in presence of two witnesses.

DAVID BAIRD MACDONALD.
JACKSON CALVERT.

Witnesses:
R. W. C. TAYLOR,
GEORGE LESTER.